United States Patent
Nyamwange

(10) Patent No.: US 11,836,740 B2
(45) Date of Patent: Dec. 5, 2023

(54) COUNTLESS SYSTEM FOR PRE-STAGING AND EXECUTING TRANSACTIONS

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 229 days.

(21) Appl. No.: 16/888,747

(22) Filed: May 31, 2020

(65) Prior Publication Data

US 2021/0374766 A1    Dec. 2, 2021

(51) Int. Cl.

| | |
|---|---|
| *G06Q 30/016* | (2023.01) |
| *G06Q 30/018* | (2023.01) |
| *G06Q 20/40* | (2012.01) |
| *G06Q 20/32* | (2012.01) |
| *H04B 5/00* | (2006.01) |
| *G06Q 40/02* | (2023.01) |
| *G06Q 10/1093* | (2023.01) |
| *G06Q 20/18* | (2012.01) |
| *G06V 40/12* | (2022.01) |

(52) U.S. Cl.
CPC ..... *G06Q 30/0185* (2013.01); *G06Q 10/1093* (2013.01); *G06Q 20/18* (2013.01); *G06Q 20/3278* (2013.01); *G06Q 20/40145* (2013.01); *G06Q 30/016* (2013.01); *G06Q 40/02* (2013.01); *G06V 40/1365* (2022.01); *H04B 5/0031* (2013.01)

(58) Field of Classification Search
None
See application file for complete search history.

(56) References Cited

U.S. PATENT DOCUMENTS

| | | | | |
|---|---|---|---|---|
| 5,991,749 | A * | 11/1999 | Morrill, Jr. | G07B 15/02 705/40 |
| 6,648,220 | B1 * | 11/2003 | Junkins | G06Q 30/04 235/379 |
| 8,190,087 | B2 | 5/2012 | Fisher et al. | |
| 2008/0103972 | A1 * | 5/2008 | Lanc | G06Q 20/405 705/44 |
| 2016/0044033 | A1 * | 2/2016 | Hsiang | H04L 63/18 726/5 |

(Continued)

*Primary Examiner* — William J Jacob
(74) *Attorney, Agent, or Firm* — Weiss & Arons LLP

(57) ABSTRACT

A system for staging and executing secure, service-based, transactions. The transactions are staged by a mobile device. The system may include a receiver. The receiver receives a communication from the mobile device in order to stage a transaction. The system may also include a near-field communication (NFC) device mounted in the CSC. The NFC device may communicate with the receiver. When the receiver receives a pre-staging communication, the receiver sets the NFC device to a staged state. In the staged state, the NFC device performs an NFC handshake with the mobile device. Following the NFC handshake, the receiver receives a signal from the mobile device. The signal includes a biometric confirmation of the identity of the user and an identification of the mobile device. The biometric confirmation may be derived by the mobile device from a biometric parameter associated with the user. The handshake initiates completion of the transaction.

18 Claims, 4 Drawing Sheets

(56) References Cited

U.S. PATENT DOCUMENTS

| | | | |
|---|---|---|---|
| 2016/0180343 A1* | 6/2016 | Poon | H04L 63/0861 |
| | | | 705/44 |
| 2017/0249794 A1* | 8/2017 | Davis | H04L 63/0861 |
| 2020/0193433 A1* | 6/2020 | Yen | G06Q 20/40 |

* cited by examiner

CONTACTLESS SYSTEM FOR PRE-STAGING AND EXECUTING TRANSACTIONS

FIELD OF TECHNOLOGY

This disclosure generally relates to services initiated for completion at customer service centers (CSCs).

BACKGROUND

The branch has been the foundation for the financial services industry and the channel of choice for most customers. However rapid advancements in digital technologies and an increasing number of channel options are changing how customers view and utilize traditional branch locations.

To meet the expectations of given current resource-related pressures, financial institutions, as well as other customer support industries, are looking to improve the productivity of their staff and the efficiency of their branch operations with customers. Providing fast, easy access to timely, contextual information on customers, products/services and transaction details, can significantly lower resource costs and heighten overall branch performance. Heightened performance shortens all traditional bank (and other CSC) processing times. Such services may include, for example, business loan payments, checking account deposits, savings account deposits, debit and credit card applications, merchant services (credit card processing, reconciliation and reporting, check collection), treasury services (e.g., payroll services, and deposit services), large sum withdrawals, large sum deposits, money orders, money grams, cashier's checks, cash money transfer to an added contact on a user mobile device, check deposit and on-demand applications, loan application initiations, cash money transfer, wire transfer or direct deposit (DDO), automobile loan cash payments, on demand check requests, all CSC on-site services that include paper written or verbal communication, and human contacts between the teller and the consumer.

Automating customer-focused services and processes allows customer-facing employees to spend more time performing high-impact services. In addition, branch operations can focus on continuous process and performance improvements based on throughput.

Financial services, and other customer-support, industries seek to revamp the traditional retail services experience. Accordingly, it would be desirable to reduce wait times at branches of such industries by enabling customers to substantially pre-complete services prior to visiting the branch.

It would also be desirable to carry out self-service transactions substantially completely from a remote location.

It would be yet further desirable to enable access to substantially all products via iPads™, mobile phones or other mobile devices.

In addition, it would be desirable to enable all services and products in the common areas of the financial services center, or other CSC, prior to use by the customer needing to be served at quick-serve counters, quick-service terminal (QST) or at the teller.

It would also be desirable to serve the customer with just near field communication NFC) non-contact request access in order to reduce the transfer of contact-communicated germs.

SUMMARY OF THE DISCLOSURE

It is an object of the invention to carry out self-service transactions substantially completely from a remote location.

It is a yet further object of this invention to enable access to substantially all services and products via iPads™, mobile phones or other mobile devices.

In addition, it is an object of the invention to enable all services and products in the common areas of the customer support center (CSC) prior to use by the customer needing to be served at quick-serve counters or at the teller.

It would also be desirable to respond to the customers need for services with nearfield communication (NFC) non-contact request access in order to reduce the transfer of contact-communicated germs.

Methods for pre-staging and executing one or more secure, service-based, transactions are provided. In certain embodiments, the methods may include one or more secure transactions pre-staged by a mobile device. The mobile device may be associated with a system user.

The methods may include receiving a service pre-staging communication from the mobile device. The receiver may, in certain embodiments, be located in a CSC.

In response to receiving the service pre-staging communication, the method may include pre-staging a secure, service-based, transaction in an NFC device. The NFC device may be mounted in the CSC. In response to the receiver receiving the communication from the mobile device, the method may preferably include setting an NFC device to a pre-staged state.

The staged state may be configured for receiving a signal from the mobile device. The NFC device may be mounted in the CSC. The NFC device may be in electronic communication with the receiver.

The method may also include performing an NFC handshake with the mobile device. The NFC handshake may include receiving the signal from the mobile device. The signal may include a biometric confirmation of the identity of the user. The biometric confirmation may be derived by the mobile device from at least one biometric parameter associated with the user. The signal may also include an identification of the mobile device. The NFC handshake preferably confirms the identity of the user. The NFC handshake also serves to initiate completion of the secure transaction.

For the purposes of this application, an NFC handshake should be understood to refer to electronically coupling a CSC module to a mobile device. Basically, a user moves his mobile device within a pre-determined proximity of the CSC module and then the mobile device listens. The CSC module passes an NFC tag to an initiator such as a mobile device and says "here I am—let's connect." Globally, an NFC allows two pieces of hardware to communication and instruct each other—in this case with respect to execution of the pre-schedule service—and then move on from there.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
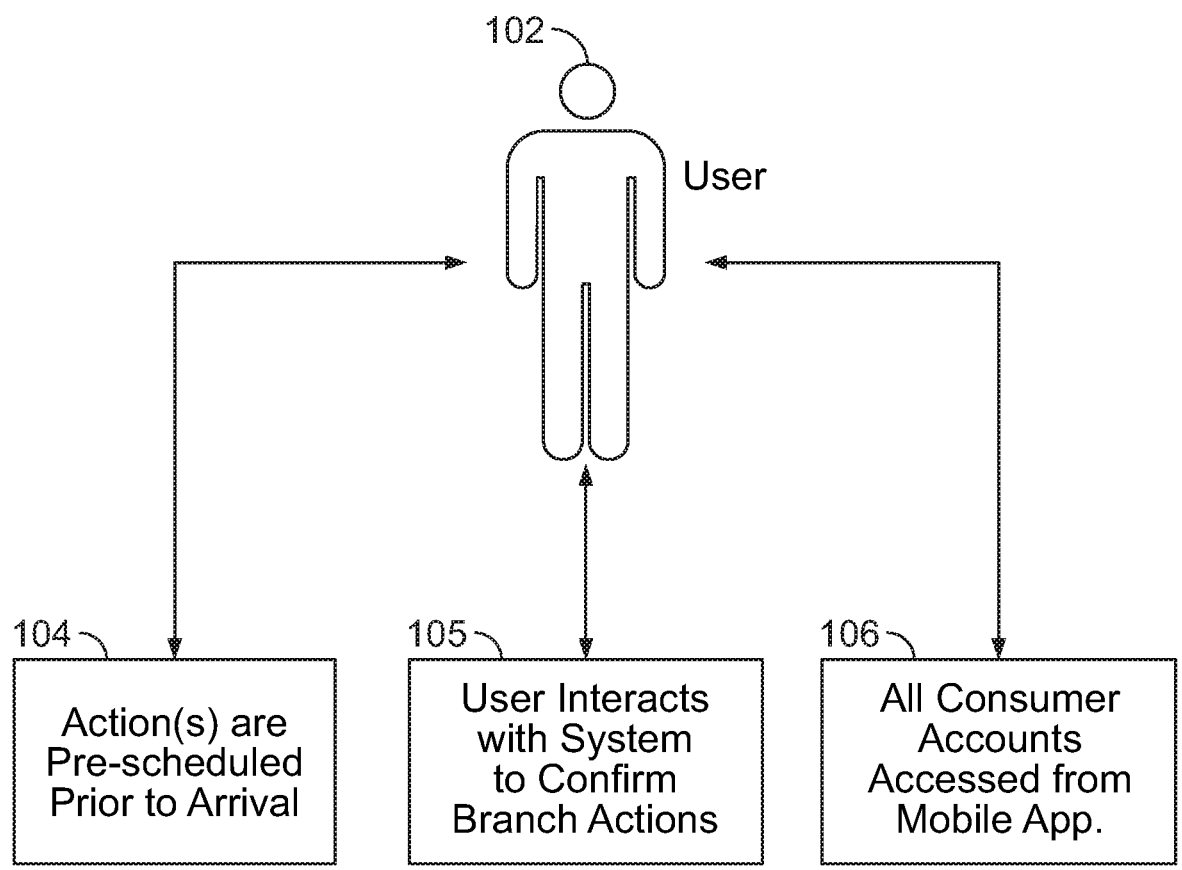
FIG. 1 shows an illustrative diagram of a user in accordance with the principles of the disclosure.

In embodiments of the disclosure, scheduled CSC service requests may be made by a customer or consumer for pick up at any branch of the CSC. These scheduled services may be arranged for completion at a local or available branch. These branches preferably support actions that can be completed by contact centers, self-service machines, personal bankers and branches.

A user may choose to have his/her requests completed at a preferred location branch location that is convenient for the user. In some embodiments, prior to the user going to the CSC, or a branch of the CSC, in the next day or hour, he or she preferably requests performance of services. He then may also schedule a time, or a window of time, for performance of the service, such as a pick-up of a money order, a large deposit or a pick-up of a large withdrawal.

Upon arrival at the CSC, the user may activate an application on his/her mobile device. The application may set the device to initiate an NFC handshake with a dedicated NFC terminal at the CSC. In addition, the application may obtain from the user, using known hardware, one or more biometric parameters. For example, the user may be prompted to scan his/her finger for a finger print (and/or to enter some other suitable biometric parameters) and/or enter a passcode to approve the pending scheduled transaction.

The device may then be brought proximal to a dedicated NFC terminal within the CSC and an NFC connection may be made between the user device and the dedicated NFC terminal. The transaction can then be authorized by the pre-staged NFC terminal, in connection with a suitable backend verification which relays that authorization back to the NFC modem in the NFC terminal or other suitable location. From this point further, the authorized request is preferably processed the same way it would be in a traditional transaction. For example, when the user requests a money order, a teller may be immediately alerted to produce and provide a prepaid money order to the waiting customer.

The following description relates to systems and methods for enabling users to implement scheduled or planned CSC services requests. In certain implementations, a user request identifies items or services that the CSC provides. The request may also identify, for the user, local branches or stations preferably proximal to, and convenient for, the user. The user is then able to conveniently travel to the CSC branch to complete the scheduled services.

In accordance with exemplary embodiments of the present invention, systems and methods are provided for automated customer scheduled requests and completion of the requests using NFC technology at the CSC or branch.

In accordance with certain embodiments of the present invention, an existing NFC system, which is provided on many smart phones or devices, may be leveraged. Such an NFC system may be leveraged to communicate, via an NFC terminal, with a logical backend server at the CSC and a memory coupled to the logical server. The logical server may instruct completion of, automate or modify the request. The requested services may preferably be detected, and read, by a single push communication from the NFC module. After the requests have been authorized the service may preferably be completed. The user may be immediately, upon user entry to the branch, be served with his/her services, thereby saving time and resources by reducing user time at the branch. The saving of time and resources directly improves CSC processing times of all services.

A system for pre-staging and executing secure, service-based, transactions is provided. The secure transactions may preferably be pre-staged by a mobile device associated with a system user.

The system may include a near-field communication (NFC) device mounted in a customer support center. The NFC device is preferably in electronic communication with a receiver. When the receiver receives the communication from the mobile device, the NFC device preferably switches to a staged state.

When said NFC device is in the staged state, the NFC device is configured for performing an NFC handshake with the mobile device. The NFC handshake may include receiving a signal from the mobile device. The signal may include a biometric confirmation of the identity of the user and an identification of the mobile device. The biometric confirmation may be derived by the mobile device from at least one biometric parameter associated with the user. The handshake may initiate completion of the secure, service-based transaction.

The receiver may be located in a customer support center (CSC) and the receiver may be configured to receive a communication from the mobile device. The communication may act to pre-stage a secure, service-based, transaction.

The communication may include the CSC receiving an electronic communication.

The biometric confirmation of the identity of the user may include performing a comparison to a pre-registered a biometric parameter.

The biometric confirmation of the identity of the user may include an electronic file that includes a validation of a correspondence of a biometric parameter currently retrieved from the user with the stored biometric parameter.

The biometric confirmation of the identity of the user may include an electronic file that corresponds a biometric parameter currently retrieved from the user with the stored biometric parameter.

The biometric confirmation of the identity of the user may include an electronic file that validates a correspondence of a user fingerprint retrieved from the user with a stored user fingerprint.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows an illustrative diagram of a user in accordance with the principles of the disclosure. FIG. 1 shows a user 102 with certain access to his accounts. At 106, FIG. 1 indicates, schematically, that he has access to all consumer accounts from his or her mobile application.

Figure 2:
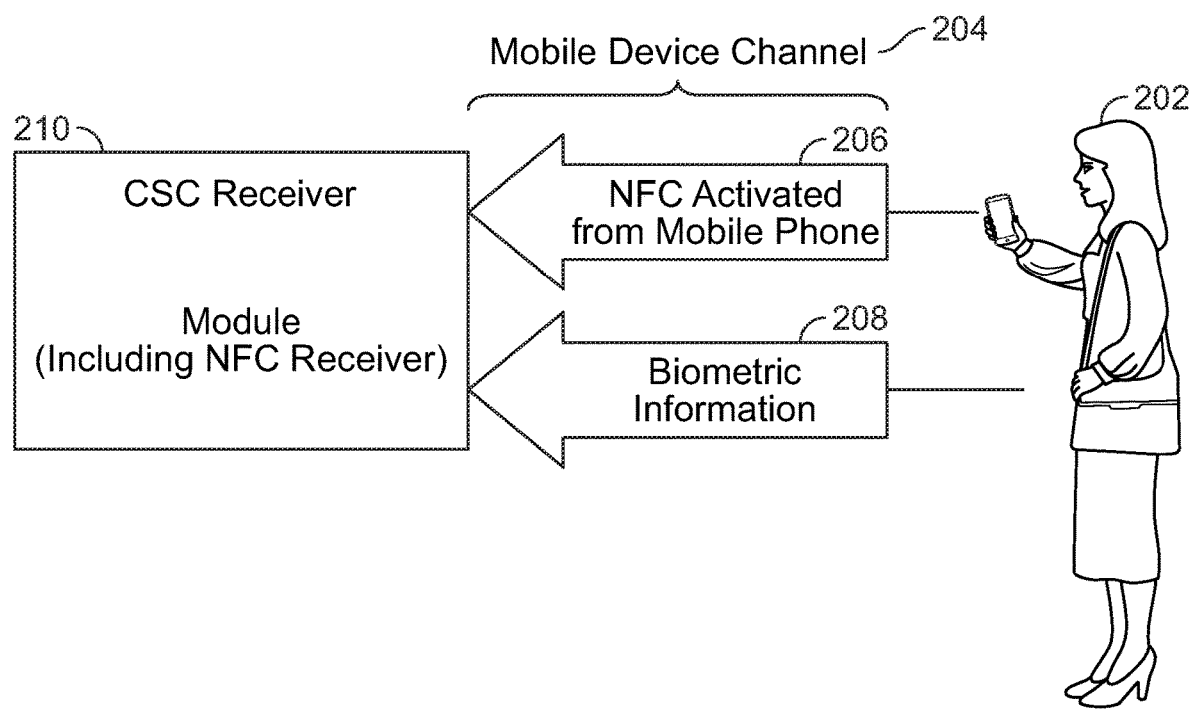
FIG. 2 shows an illustrative diagram of a user leveraging a mobile phone channel for use in accordance with principles of the disclosure.

At 104, FIG. 2 shows that the user also has the ability to pre-schedule action(s) prior to the user's physical arrival at the branch. These pre-scheduled action(s) may, under certain circumstances, require access to user accounts, such as the user accounts shown as accessible at step 106.

When one of the actions are elected to be pre-scheduled, the pre-scheduling should be checked for validity against the current status of the user. For example, when a user may select to pre-schedule to arrive at a branch and withdraw 10,000 USD from his or her account, the mobile app may be configured to determine whether sufficient funds exist in the accounts to satisfy the request.

If sufficient funds exist to satisfy the request, then the pre-scheduling is preferably transmitted to the branch.

If sufficient funds do not exist, then, in certain embodiments, the branch system may respond with a counter-offer to the user (as shown at 105). The counter-offer may preferably include an adjusted request for review by the user. If the adjusted request is acceptable to the user, the user may accept the request and schedule completion of the adjusted request.

Scheduling completion of the request may include the user setting a window of time within which the user expects to arrive at the branch.

FIG. 2 shows an illustrative diagram of a user leveraging a mobile phone channel for use in accordance with principles of the disclosure. FIG. 2 shows a user 202. User 202 leverages a mobile device channel, 204, to communicate with CSC receiver 210.

Mobile phone channel 204 shows, schematically, at 206 the user may activate in NFC handshake and communication between the mobile device and the CSC receiver module (which includes an NFC receiver).

Figure 3:
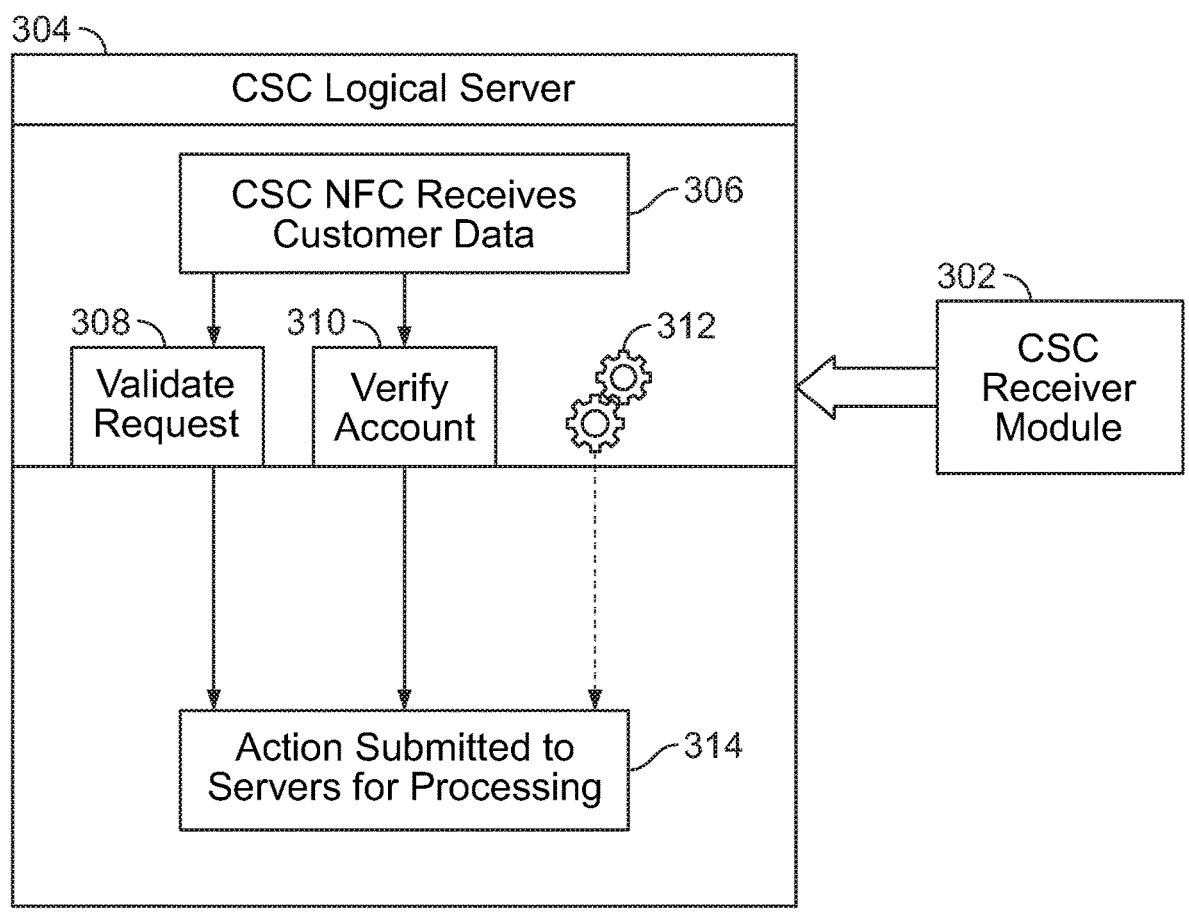
FIG. 3 shows schematic diagram for integration of the mobile phone channel in accordance with principles of the disclosure.

FIG. 3 shows a schematic diagram for integration of the mobile phone channel in accordance with principles of the disclosure. FIG. 3 shows how the CSC receiver module 302 interfaces with the CSC logical server 304. Interface 312 is shown schematically. Interface 312 indicates that the entire submission received from CSC receiver module 302 will be submitted as an action to a server for processing, as shown at 314.

At 306, the logical server is shown as having received the customer data via the NFC connection. Upon receipt of the customer data, at 306, the logical server preferably validates the request, at 303, and verifies the account information (and, in some embodiments, account sufficiency) at 310.

The validate request step, 308, in the context of the current disclosure, indicates that the biometric information or other suitable identifying parameter and/or device-identifying information is received from the CSC receiver module 302.

It should be noted, in some embodiments, that the biometric information may be confirmed at the mobile device. In some embodiments, the biometric information may be received in its new form at CSC logical server and confirmed there.

With respect to the embodiments that validate the biometric information at the mobile device, is should be noted that utilities that valid biometrics on mobile devices are currently known following verification, these embodiments transmit a verified signal to server 304 which may be used to satisfy the validate request step 308.

In embodiments where the confirmation of the biometric information is performed at the server it may require some sort of pre-registration performed by the user. For example, a user may be required to "deposit" his biometric information—e.g., by providing the CSC with his fingerprint information, prior to his relying on server 302 to validate his biometric information at the time of the scheduling services. As such, server 302 will be pre-configured to support biometric verification at the time of a user scheduling a service. In some embodiments, the user may also be required to pre-register his or her device in order to speed uptake and delivery of the user service.

Step 310 shows analyzing the scheduled service and, based on analysis of the service, verifying the account information to determine whether the requested service can be satisfied in view of the current state of the user accounts.

Figure 4:
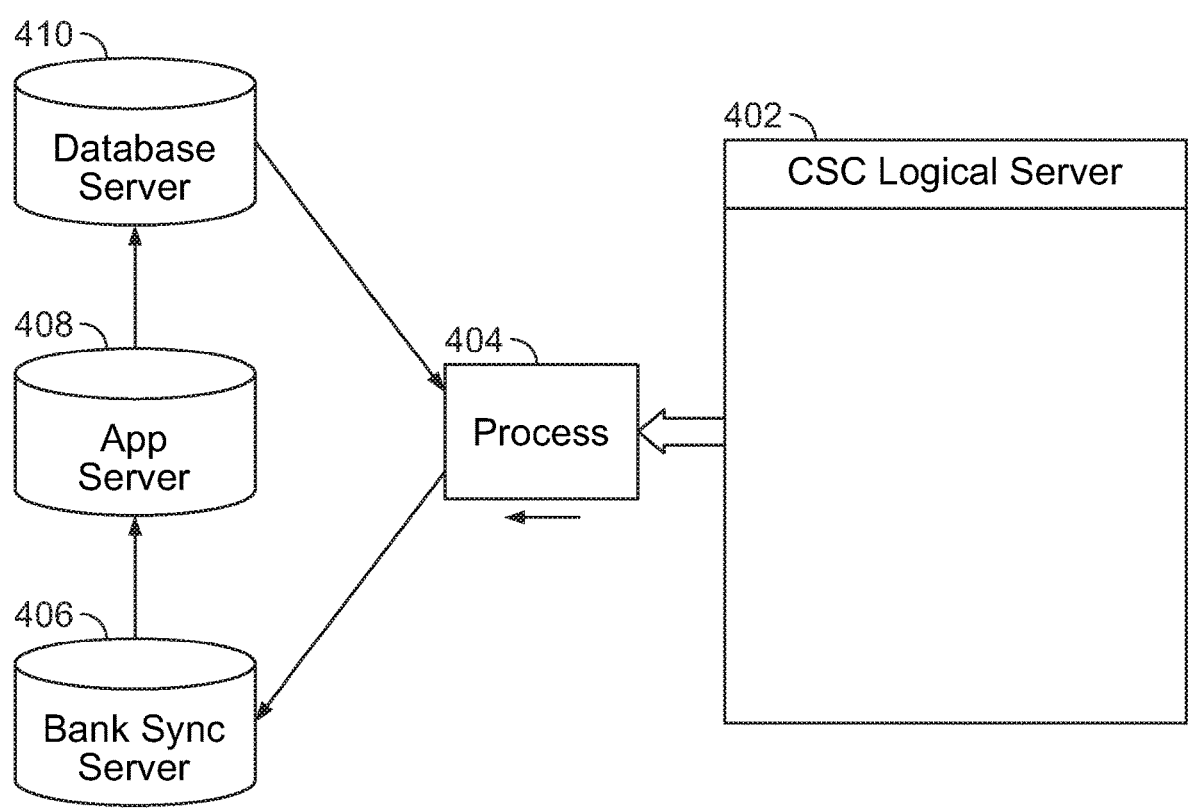
FIG. 4 shows a schematic diagram of further integration of the mobile phone channel in accordance with principles of the disclosure.

Once server 304 has received the request data (306), validated the request (308), and verified the account information (310), the action may be submitted to the servers shown in FIG. 4 for further processing.

FIG. 4 shows a schematic diagram of further integration of the mobile device channel in accordance with principles of the disclosure.

More specifically, FIG. 4 shows an exemplary embodiment of an internal CSC process for preparing the completion of the requested services prior to the arrival of the user.

At 402-404-406, CSC communicates the validated and verified request to the CSC sync server 406.

Sync server 406 preferably synchronizes change sets (such as a change set associated with the user request) which can be later synchronized with other servers. App server 408 and database server 410 are examples of such other servers.

App server 408 may preferably be in communication with sync server 406. App server 408 typically works as a transport mechanism for communications between sync server 406 and database server 410. Database server 410 preferably serves to store and update the CSC database(s) (not shown) with information regarding the requested service.

Once the internal databases have been updated within the system, the system as a whole is pre-configured to receive an NFC transmission from the mobile device. The NFC transmission preferably completes the response to the request. Pursuant to completion of the request, internal commands preferably prepare the CSC to execute the request, e.g., to provide CSC personnel instructions regarding execution of the request.

Thus, a disclosure relating to staging and executing secure, service-based, transactions is provided. Persons skilled in the art will appreciate that the present invention can be practiced by other than the described embodiments, which are presented for purposes of illustration rather than of limitation. The present invention is limited only by the claims that follow.

What is claimed is:

1. A method for pre-staging and executing one or more secure, service-based, transactions, said one or more secure transactions staged by a mobile device associated with a system user, the method comprising:

receiving, using a receiver, a service pre-staging communication from the mobile device, said receiver being located in a customer support center (CSC);

in response to receiving said service pre-staging communication, staging a secure, service-based, transaction in a near-field communication (NFC) device mounted in the CSC, said staging comprising, in response to the receiver receiving the communication from the mobile device, using an app server within the CSC to update a database server within the CSC, said database server storing and updating a CSC database with information regarding the pre-staging such that the CSC database sets the NFC device to a staged state, said staged state for receiving a communications signal from the mobile device, said NFC device mounted in the CSC, said NFC device being in electronic communication with the receiver;

performing an NFC handshake with the mobile device, said NFC handshake being based on the pre-staging communication and proximity of the mobile device to the NFC device; and following the NFC handshake, receiving the communications signal from the mobile device, said communications signal comprising a biometric confirmation of the identity of the user, said biometric confirmation derived by the mobile device from at least one biometric parameter associated with the user, wherein said biometric parameter is derived and verified only by the mobile device at the mobile device, and an identification of the mobile device, said NFC handshake for confirming the identity of the user and for initiating completion of the secure transaction.

2. The method of claim 1, wherein the receiving the service pre-staging communication comprises receiving an electronic communication.

3. The method of claim 1, wherein said biometric confirmation of the identity of the user comprises pre-registering a biometric parameter by retrieving the biometric parameter from the user and storing the biometric parameter.

4. The method of claim 3, wherein said biometric confirmation of the identity of the user comprises receiving an electronic file for validating a correspondence of a biometric parameter currently retrieved from the user with the stored biometric parameter.

5. The method of claim 1, wherein said biometric confirmation of the identity of the user comprises receiving an electronic file that corresponds to a biometric parameter currently retrieved from the user.

6. The method of claim 1, wherein said biometric confirmation of the identity of the user comprises receiving an electronic file for validating a correspondence of a user fingerprint retrieved from the user with a stored user fingerprint.

7. A system for pre-staging and executing secure, service-based, transactions, said secure transactions staged by a mobile device associated with a system user, the system comprising:

a receiver located in a customer support center (CSC), said receiver for receiving a communication from the mobile device, said communication for pre-staging a secure, service-based, transaction;

an app server located within the CSC, said app server for, in response to the receiver receiving the communication from the mobile device, updating a database server within the CSC, said database server that stores and updates a CSC database with information regarding the pre-staging; and a near-field communication (NFC) device mounted in the CSC, said NFC device in electronic communication with the receiver wherein, when the receiver receives the communication from the mobile device, the receiver is configured to set the NFC device to the staged state;

wherein,
when said NFC device is in the staged state, the NFC device is configured for performing an NFC handshake with the mobile device, said NFC handshake being based on the pre-staging communication and proximity of the mobile device to the NFC device, said NFC handshake comprising receiving a signal from the mobile device, said signal comprising a biometric confirmation of the identity of the user and an identification of the mobile device, said biometric confirmation derived by the mobile device from at least one biometric parameter associated with the user, wherein said biometric parameter is derived and verified only by the mobile device at the mobile device, and said NFC handshake that initiates completion of the secure, service-based transaction.

8. The system of claim 7, wherein the service pre-staging communication comprises receiving an electronic communication.

9. The system of claim 7, wherein the biometric confirmation of the identity of the user comprises performing a comparison to a pre-registered a biometric parameter.

10. The system of claim 9, wherein said biometric confirmation of the identity of the user comprises an electronic file that includes a validation of a correspondence of a biometric parameter currently retrieved from the user with the stored biometric parameter.

11. The system of claim 7, wherein said biometric confirmation of the identity of the user includes an electronic file that corresponds to a biometric parameter currently retrieved from the user with the stored biometric parameter.

12. The system of claim 7, wherein said biometric confirmation of the identity of the user comprises an electronic file that validates a correspondence of a user fingerprint retrieved from the user with a stored user fingerprint.

13. A system for pre-staging and executing secure, service-based, transactions, said secure transactions staged by a mobile device associated with a system user, the system comprising:

a near-field communication (NFC) device mounted in a customer support center (CSC), said NFC device in electronic communication with a receiver wherein, when the receiver receives the communication from the mobile device, the NFC device switches to the staged state;

wherein, when said NFC device is in the staged state, the NFC device is configured for performing an NFC handshake with the mobile device, said NFC handshake being based on:

a pre-staging communication received from the mobile device by a receiver located in the CSC, the communication for pre-staging a secure, service-based, transaction; and proximity of the mobile device to the NFC device; and following said NFC handshake, the receiver is further configured for receiving a signal from the mobile device, said signal that comprises a biometric confirmation of the identity of the user and an identification of the mobile device, said biometric confirmation that is derived by the mobile device from at least one biometric parameter associated with the user, wherein said biometric parameter is derived and verified only by the mobile device at the mobile device, and said NFC handshake that initiates completion of the secure, service-based transaction;

wherein:

the CSC includes an app server located within the CSC, said app server for, in response to the receiver receiving the communication from the mobile device, updating a database server within the CSC, said database server that stores and updates a CSC database with information regarding the pre-staging.

14. The system of claim 13, wherein the service pre-staging communication comprises receiving an electronic communication.

15. The system of claim 13, wherein the biometric confirmation of the identity of the user comprises performing a comparison to a pre-registered a biometric parameter.

16. The system of claim 15, wherein said biometric confirmation of the identity of the user comprises an electronic file that includes a validation of a correspondence of a biometric parameter currently retrieved from the user with the stored biometric parameter.

17. The system of claim 13, wherein said biometric confirmation of the identity of the user includes an electronic file that corresponds to a biometric parameter currently retrieved from the user with the stored biometric parameter.

18. The system of claim 13, wherein said biometric confirmation of the identity of the user comprises an electronic file that validates a correspondence of a user fingerprint retrieved from the user with a stored user fingerprint.

* * * * *